April 11, 1961  N. B. NICHOLS  2,978,912
GYROSCOPE ANTI-TUMBLING APPARATUS
Filed June 15, 1949  4 Sheets-Sheet 1

INVENTOR
NATHANIEL B. NICHOLS
BY
ATTORNEY

INVENTOR
NATHANIEL B. NICHOLS

April 11, 1961 N. B. NICHOLS 2,978,912
GYROSCOPE ANTI-TUMBLING APPARATUS
Filed June 15, 1949 4 Sheets-Sheet 4

Inventor
NATHANIEL B. NICHOLS

Attorney

United States Patent Office 2,978,912
Patented Apr. 11, 1961

2,978,912
GYROSCOPE ANTI-TUMBLING APPARATUS

Nathaniel B. Nichols, Rochester, N.Y., assignor, by mesne assignments, to the United States of America as represented by the Secretary of the Navy Filed June 15, 1949, Ser. No. 99,265

7 Claims. (Cl. 74—5.2)

This invention relates to improvements in gyroscope apparatus and more particularly to improvements in that type of apparatus in which means is provided for precessing a gyroscope and means operatively connected to the gyroscope is responsive to the degree of precession thereof. According to the construction of the apparatus here involved, a circuit is provided interconnecting these means in a manner to limit the precession to an allowable value.

The invention is of such a nature that it is especially adapted for use in the gun fire control system disclosed and claimed in the copending application of Ivan A. Getting for Gun Fire Control Method and System, Serial No. 61,558, filed November 23, 1948.

In this copending application there is disclosed a director which is rotatable in train and has an antenna system which is movable in elevation. A precessable gyroscope, which is herein called the line-of-sight or rate gyroscope, has associated therewith a pair of torque motors adapted, when energized, to precess the gyroscope in a pair of mutually perpendicular directions coinciding with two of the coordinates of target motion utilized in the director. The axis of rotation of the gyroscope is maintained substantially aligned with the straight line between the target and director.

Preferably there is provided transformer means for obtaining two voltages which represent the angular error between the line of sight of the director and the axis of rotation of the gyroscope. It is these two voltages which are applied to servo apparatus which moves the director in train and the antenna system in elevation in such a manner as to keep the line of sight of the director substantially on the target as the latter moves with respect to the director.

It has been found in practice, however, that occasionally the gyroscope is precessed in excess of allowable limits as determined by stops associated therewith. This results in the gyroscope's going through a sequence of undesired mal-operations known as tumbling, the effect of which is to produce excessive internal error signals and resulting erratic and uncontrolled motions of the director in train and of the antenna in elevation.

According to the present invention, an anti-tumbling circuit is provided to which the afore-mentioned transformer means also supplies a pair of voltages. When these latter voltages become of sufficient magnitude due to rapid precessive movements in which the angular error between the axis of rotation and the line of sight becomes large, these voltages are utilized to provide two feedback voltages into the circuits which energize the two torque motors respectively. Thereby, the energization of these motors is reduced so that the rates of precession of the gyroscope are also reduced. A novel switching circuit employing a pair of biased diodes is provided for switching the degenerative voltages into the circuits when the error signals are large, and thereafter removing the degenerative feedback voltages when the angle error signals are small.

Accordingly it is a principal object of the invention to provide means for inhibiting the tumbling of the gyroscope by limiting the precessing currents which are conducted to the precessing torque motors associated therewith.

Another object is to provide new and improved gyroscope anti-tumbling apparatus.

Another object is to provide a new and improved stabilizing circuit for gyroscope apparatus.

Still another object is to provide a new and improved diode switching circuit.

Various other objects and advantages of the invention will be more apparent after a consideration of the following specification taken in connection with the accompanying drawings, in which.

Figure 1:
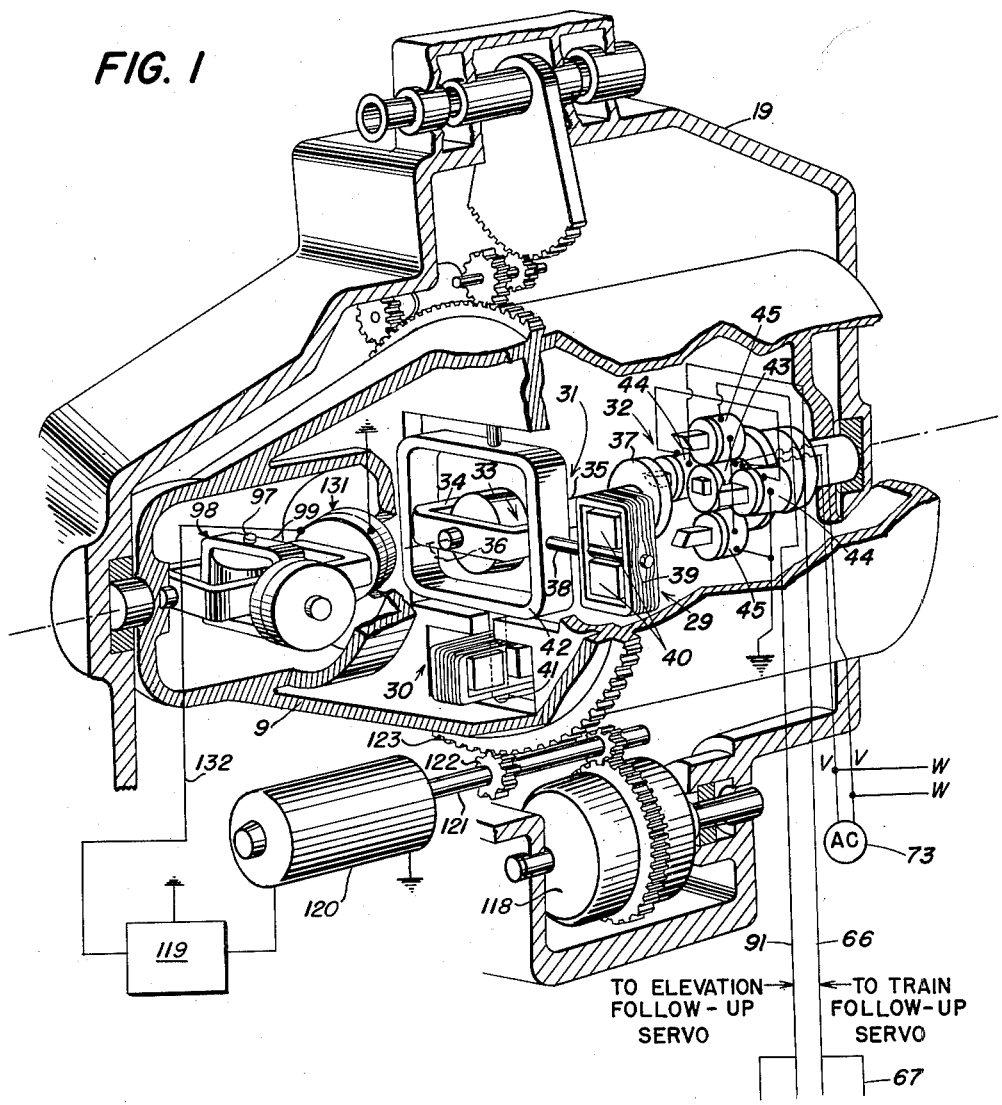
Fig. 1 is a fractional perspective view of a gyroscope unit casing according to one embodiment of a gun director, showing the train and elevation torque motors and associated apparatus.

Referring now to the drawings more in detail, the invention will be fully described.

Figure 2:
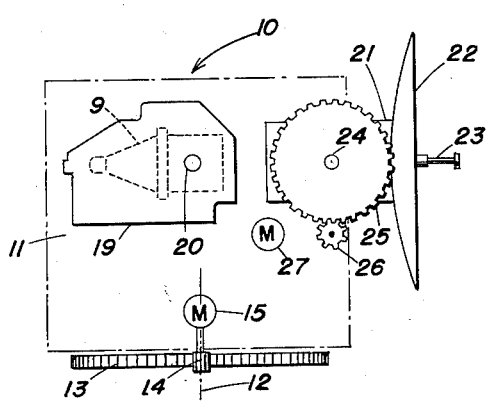
Fig. 2 is a diagrammatic side elevational view of the gun director.

Reference is made to Fig. 2, in which the director above referred to is indicated generally by the reference numeral 10 and includes a housing 11. The vertical axis of the director 10 is indicated at 12 and the housing 11 is rotatable in deck train on this axis as through the driving of a ring gear 13 disposed on the bottom of the housing 11 and a pinion 14 provided on the shaft of a motor 15. This motor 15 is part of the train follow-up servo 16, Fig. 4, and the latter includes an amplidyne, indicated at 17, and usually consisting of a motor generator set wherein a small current, such as would be supplied by an amplifier 18, may be made to operate the motor of said set and produce a large current output at the generator for the driving of the train motor 15.

At 19 in Fig. 1 is shown a gyro unit casing and this includes the line-of-sight or rate gyroscope 31. The gyroscopic apparatus generally designated 31 has a rotor 33 and, as shown in Fig. 1, the rotor is rotatable in inner gimbal member 34, and may rotate in the direction indicated by the arrow. The rotor 33 is driven by suitable means, not shown, for example a synchronous motor energized from a suitable A.-C. source of stable frequency. It will presently appear how the line-of-sight gyroscope may be made to precess in true elevation and true traverse.

At 98 there is shown a vertical seeking gyroscope rotatable in a gimbal 99 as on a shaft 97. It will be understood that this vertical gyroscope does not form a part of the present invention.

The casing 19 is arranged, through suitable means such as trunnions 20, to swing in a vertical plane and a mount 21 operatively connected thereto by means, not shown, and adapted to swing in the same plane in an equal amount, carries the parabolic reflector, or "dish" 22, from the focus of which projects the nutated wave guide or antenna feed 23, Fig. 2. When it is stated herein that the casing 19 and mount 21 associated therewith swing in a vertical plane, it is meant that they move in a plane perpendicular to the plane of the deck.

Figure 3:
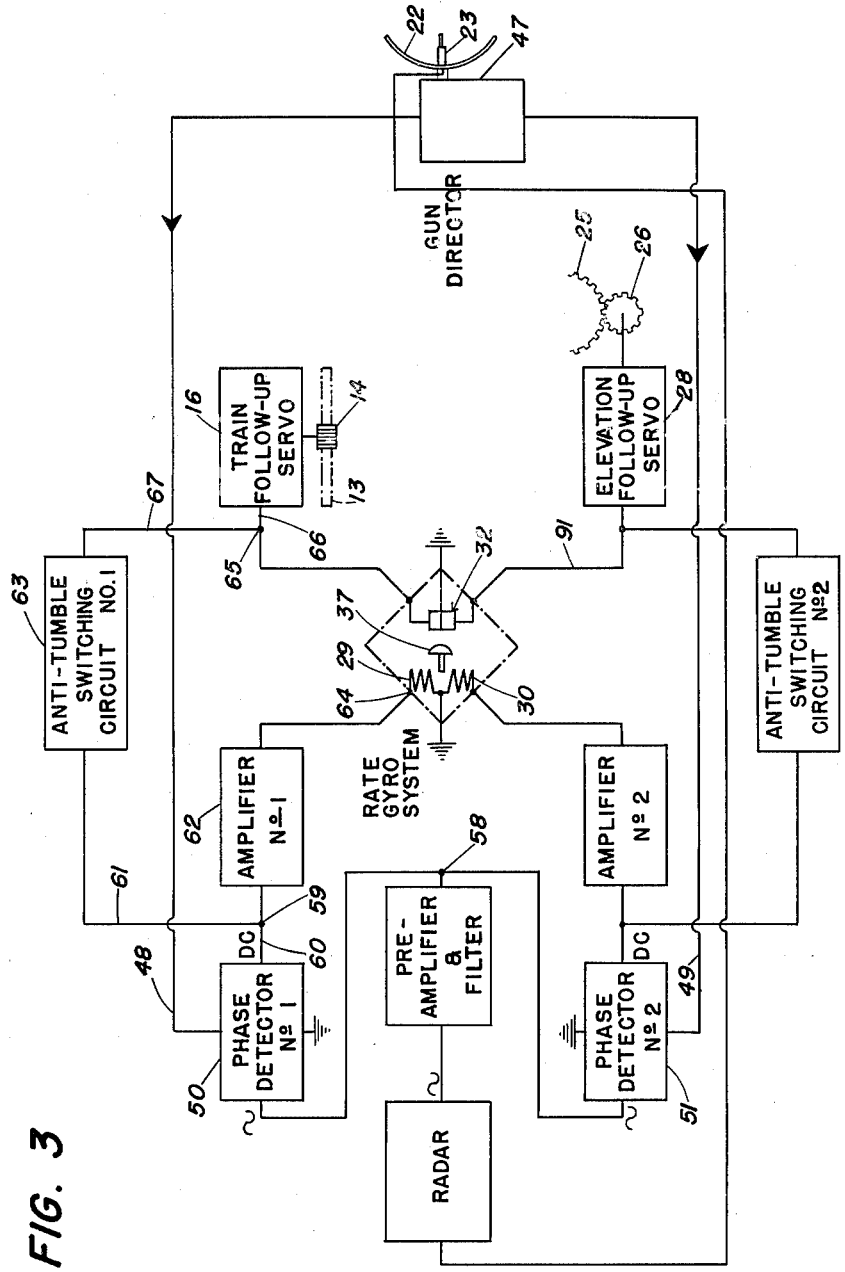
Fig. 3 is a block diagram of the electrical system involved in the practice of the invention and illustrating the relationship of the anti-tumble switching circuits to the electrical apparatus for positioning the director.

To this end, mount 21 has a horizontal shaft 24 which carries a mesh gear 25. A motor 27 is provided as part of the elevation follow-up servo 28, Fig. 3, and the shaft of this motor carries a pinion 26 in mesh with gear 25. The internal details of servo 28, Fig. 3, are not shown since they are substantially identical with those of the train servo 16, above referred to.

The inner gimbal 34, Fig. 1, has a forward extension or shaft 35 which is concentric with the spin axis 36 of the line-of-sight gyroscope 31. This member 35 terminates in a reluctance dome 37 of a transformer indicated generally by the reference numeral 32.

A pair of torque motors generally designated by the numerals 29 and 30, respectively, are provided to precess the gyroscope 31, Fig. 1, and when the latter is precessed through the action of either of these torque motors, a voltage or current differential is generated in transformer 32. A lateral shaft 38 is affixed to gimbal 34 and extends therefrom at right angles to the spin axis 36, through an aperture in gimbal 42. This member 38 carries the coil 39 of torque motor 29 which, as will appear, is the train torque motor. This coil 39 may be said to virtually "float" in a magnetic field which is provided by permanent magnets 40, as shown in Fig. 1. It will be understood that whereas magnets 40 and the corresponding magnet of torque motor 30 are shown, for ease in illustration, as unsupported, they may be in practice suitably mounted by means, not shown, upon the gyroscope housing 9, in a manner to permit free precessive movements of the shafts and motor coil windings.

Upon the energization of the coil 39 by the train or traverse component of the error signal, the coil and its associated stem 38 are caused to turn, thereby tending to upset axis 36 in the vertical plane but responding with a displacement at ninety degrees from the upsetting force or precession of the gyroscope 31 in a traverse plane. Thus the reluctance dome 37 is caused to traverse transformer 32 and generate the current which actuates the train servo 16.

Torque motor 30 may be identical in structure and operation with the torque motor 29 except, as stated above, it is calculated to precess the line-of-sight gyroscope in elevation instead of in train. Therefore there is a stem 41 for torque motor 30 which extends vertically from the outer gimbal 42 and the arrangement is such that when the gyroscope member 31 is precessed in elevation the reluctance dome 37 is caused to move vertically with respect to transformer 32, thereby generating the current which actuates elevation servo 28.

The aforementioned crossed-E transformer generally designated at 32 is mounted on the main frame of the gyroscope system at the front of the line-of-sight gyroscope. Two of the side coils are oriented in the vertical plane and are connected in phase opposition while the other two side coils are oriented in the traverse plane and also connected in phase opposition. When the gyroscope is center positioned so that the air gap between the dome and the transformer is the same on all sides, the induced voltages in coils on opposite sides of the transformer are equal, and being opposite in phase, the output of each of the two circuits is zero. When the gyroscope is moved in traverse and in elevation with respect to the director mount, error voltages are developed in the corresponding transformer secondaries which, by means of the follow-up servo systems, drive the corresponding drive motors (deck elevation and train) in directions that will reduce the error voltages. Thus the movements of the director in train and of the antenna in elevation are such that the line of sight is made to follow closely the axis of the rate gyroscope.

As stated, the antenna in the dish 22 produces a conical or spiral scan. A conventional two phase reference generator is utilized in connection with a phase detection system to determine the traverse and elevation pointing error components. At point 59, Fig. 3, neglecting, for the moment, the anti-tumble loops, the signal voltage is proportional to the traverse pointing error.

When a traverse precession current is applied to the line-of-sight gyroscope, a voltage appears at point 65 which corresponds to the position error between the line-of-sight gyroscope and the mount in traverse. The follow-up servo drives the mount in train in a manner which tends to make it coincide with the position of the gyroscope. When the voltage at point 65 exceeds a critical value, as stated before, the anti-tumble loop provides the desired degeneration in order to limit the value of the precession current to an acceptable value.

As before noted, there is an analogous arrangement for positioning the mount in elevation.

In a very general way, the operation of the loop is based upon the principle of switching a degenerative feedback circuit into the system when needed and disconnecting the same when not needed. The switching is accomplished by changing the bias on a pair of parallel diodes, as will be subsequently more fully explained. In Fig. 3, there is shown a train phase detector, designated generally by numeral 50, a train amplifier 62, the train torque motor 29, the double E transformer 32, the train follow-up servo 16, and the train anti-tumble circuit 63.

Figure 4:
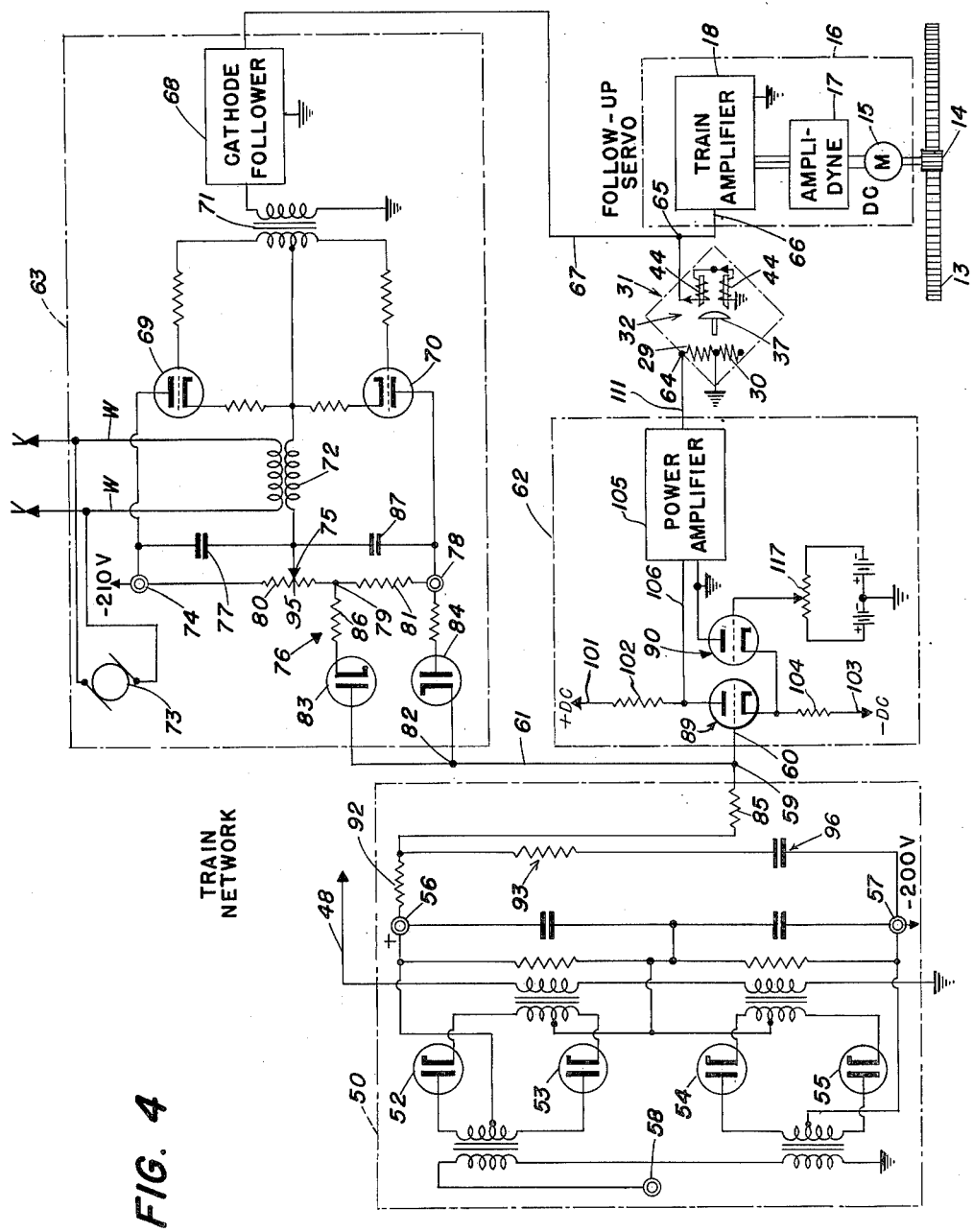
Fig. 4 is a circuit diagram of the anti-tumble circuit and phase detector circuit of Fig. 3, and associated apparatus.

Referring now particularly to Fig. 4, the tubes 52, 53, 54, and 55 constitute a full-wave phase detector. If the pointing of the director is correct insofar as traverse is concerned, but not correct in elevation, the pointing error signal entering at point 58 may be out of phase with the traverse reference signal on lead 48 because the two-phase reference generator 47 has been arranged in this manner. Under these circumstances there will be substantially no net voltage output across terminals 56—57 of the phase detector.

Resistors 93 and 92 and capacitor 96 may comprise a "proportional and integral net" for stabilizing the servo loop, when data comes from the radar system. Let it be assumed by way of description that the phase of the pointing error signal with respect to the traverse reference signal is such that the phase detector 52 causes point 56 to be at a higher potential than point 57. Point 59 will similarly be elevated, causing a strong traverse precession current to enter the line-of-sight gyro system at point 64. Tube 90 is merely for the purpose of setting the D.-C. voltage level at point 95.

As a result of the large current entering the torque motor, the gyro will precess rapidly in traverse, and a strong A.-C. signal will be available at point 65 indicating the error between the position of the gyro and the position of the mount. This signal is passed through a cathode follower 68 and applied to the half-wave phase detector including tubes 69 and 70. Depending upon the sense or relative direction of the displacement error of the mount with respect to the gyro, the voltage applied to the primary of transformer 71 is either in phase with or 180 degrees out of phase with the reference voltage on leads w—w, obtained from source 73.

The relative bias voltages are important in the operation of the instant system. It is noted that point 57 is held at a bias of —200 volts, while point 74 is held at a voltage of —210 volts. It is the relative values of these voltages which are important. The large negative values used in the present circuit are selected because of voltage level requirements.

In describing the operation of the circuit, the effect will first be considered when there is no pointing error signal entering at point 58. Under these circumstances, it is apparent that points 56 and 59 will be at the same potential as point 57, that is, —200 volts. There will be no voltage applied to the primary of transformer 71 if the mount is aligned with the gyro, and so the conduction of tubes 69 and 70 (under the influence of the reference voltage coupled into the plate circuits) will be equal. The point 75 on potentiometer 80 corresponding to the position of arm 75 will be at a higher potential than point 74, because of the unidirectional flow of current from 75 to 74 and the effect of condenser 77. The voltage drop from 75 to 78 will be approximately equal to the voltage drop from 75 to 74, and hence point 78 will also be at a potential of −210 volts. The point 79 will be at a potential somewhat higher than point 78 because of the flow of current from 75 to 78. The potential of point 79 may then be considered to be −190 volts when there is no pointing error signal entering at point 58.

The potential at point 82 will be the same as that at point 59. It is therefore apparent that under these circumstances neither diode 83 nor 84 will conduct, since point 82 is at −200 volts, point 79 is at −190 volts, and point 78 is at −210 volts.

In this condition, the anti-tumble loop is effectively disconnected, and the precession currents are controlled solely by the amplitude and phase of the pointing error signal. It is observed that for small values of the pointing error signal. It is observed that for small values of pointing error signal entering at point 58 the anti-tumble circuit will continue to be disconnected by the action of diodes 83 and 84.

Let it be assumed, however, that a large pointing error signal is entering at 58 and that the gyro is being accelerated more rapidly than is possible for the mount. Point 56 in the phase detector circuit of 52 may therefore be caused to assume a higher potential than point 57. Because of the rise in potential at 59, strong precession currents enter the line-of-sight gyro system, and as stated, the mount may begin to lag behind the gyro, thereby producing a considerable error voltage at 65. Polarities of the transformer windings are so arranged that under the circumstances described the plate and grid voltages of tube 69 will be 180 degrees out of phase, resulting in a virtually zero conduction for this tube. Point 75 will drop toward −210 volts, and hence the potential of point 79 will be lowered. As a result of its lower cathode voltage and higher plate voltage, tube 83 will be in a condition to conduct.

It is observed that point 59 can be considered a point where addition takes place through resistors 85 and 86. The phase detector 52 presents a relatively high impedance as seen from point 59, while phase detector 54 presents a relatively low impedance as seen from this point. For this reason, when tube 83 conducts, the voltage at point 79 may be considered to control the voltage at point 59 almost exclusively. This results in a prompt correction of the value of the precession current to such a magnitude that the mount can follow the gyro. It is even possible that the correcting signal applied by the feedback loop might actually reverse the direction of precession of the gyro if necessary. If the phase of the input pointing error signal at point 58 is such as to lower the potential at point 59, precession currents will be applied to the torque motor of the gyro in the opposite direction from those in the previous case. The relative displacement between the mount and the gyro will create an error signal at point 65 which is 180 degrees out of phase with the error signal at that point in the previous example. This voltage is applied to the primary of transformer 71, and as a result, tube 70 will be virtually cut off. This causes point 78 to rise toward the potential of point 75. When the voltage at 78 exceeds the voltage at 59, diode 84 will conduct, and point 59 will be elevated in potential, reducing the precession current as desired.

It is understood that a circuit similar to the one just described is provided to limit the elevation precession currents also.

There is now no tendency for the gyro to tumble since its displacement with respect to the mount is kept within the desired limits.

Preferably the phase detector of tubes 69 and 70 is symmetrical as to tubes and plate impedances in each loop.

In the circuit of Fig. 4, the D.-C. potentials at points 57 and 74 may be applied with respect to ground.

It will be understood that the power amplifier circuit designated in block form at 105, Fig. 4, is constructed and arranged to provide for the reversal of direction of current flow through torque motor 29 depending upon whether the voltage at point 95 varies in one direction or the other from its normal value when no error signal is being applied at point 58.

Figure 6:
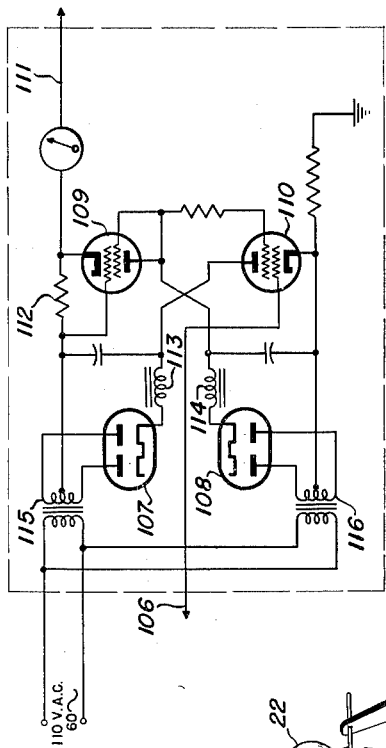
Fig. 6 is a suitable circuit diagram for the amplifier shown in block form in Fig. 3.

An amplifier suitable for the purpose is shown in Fig. 6, but comprises no part of the present invention. Point 95, Fig. 4, is connected to the control grid of tube 110 by lead 106. The dual diode tubes 107 and 108 comprise a pair of full wave rectifiers, the tube 109 may be similar to tube 110. It is noted that the four tubes are effectively in series, a path for current flow being provided from the cathode of 110 through the tube to the anode thereof, thence through inductor 113, tube 107, secondary 115, resistor 112, tube 109, inductor 114, tube 108, secondary 116, back to the cathode of tube 110. Component values may be so chosen that tube 110 may be biased for class A operation when a steady D.-C. signal of, for example, −50 volts to ground, is applied to lead 106. The value of resistor 112 is so chosen that tube 109 is under such conditions also biased at −50 volts, as determined by the voltage drop across resistor 112.

The voltage drops across tubes 109 and 110 are then substantially equal, and since they are effectively in series opposition with respect to the torque motor 29 which is connected between lead 111 and ground, no current flows in the torque motor.

It will be apparent to those skilled in the art that a change in the value of the potential on lead 106 in one direction or the other causes an unbalance in tubes 109 and 110, with the result that current flows in one direction or the other through coil 29 depending upon whether the potential on lead 106 rises above or falls below its normal value.

The circuit of tubes 89 and 90, Figure 4, comprises a means for setting or adjusting the potential on lead 106. It has already been stated that point 57 is biased −200 v. D.-C. with respect to ground in the absence of a signal at 58. The cathode of tube 89 may be connected by way of resistor 104 and lead 103 to a source of D.-C. potential of the order of −180 volts to ground. The anode of tube 89 may be connected by way of resistor 102 and lead 101 to a source of potential which may be of the order of plus 100 volts D.-C. to ground.

Under such conditions, the total source voltage applied between cathode and anode of tube 89 is 280 volts. The effective negative bias of tube 89 may be in the neighborhood of 20 volts depending upon the drop across resistor 104, and the tube may be biased for class A operation. Point 95 may, by suitable choice of component values and tube characteristics, be substantially −50 volts with respect to ground.

Tube 90 permits the normal voltage at point 95 to be adjusted within limits. By adjusting the position of the arm of potentiometer 117, the current through tube 90 and accordingly the voltage drop across resistor 104 may be adjusted.

In Fig. 1, to which particular reference is now made, is shown a pick-off transformer 131 operatively connected to the vertical seeking gyroscope 98, for obtaining a voltage proportional to $eZs$, $Zs$ being defined as the rotation of the vessel about the line of sight as a result of roll and pitch of the deck of a vessel upon which the director is mounted.

The signal from transformer 131 is applied by way of lead 132 to amplifier 119, and thence to drive motor 120, which rotates the shaft 121 which has pinion 122 secured thereto and which meshes with gear teeth 123 fixed to housing 9, rotating the whole housing and gyro assembly to compensate for rotation about the line of sight, in a manner well known to those skilled in the art of servo devices.

The device shown at 118 may be a resolver included in the apparatus shown in block form at 47, Fig. 3, for converting the reference generator signals from the reference generator from deck to true coordinates. It will be understood that the reference generator, not shown in detail, is operatively connected to the scanning mechanism, and produces two voltages of the same frequency as the scanning frequency but displaced 90 degrees in time and phase.

The aforedescribed portion of the apparatus shown constitutes no part of the present invention, and it will be understood that the anti-tumbling circuits and apparatus shown do not require such an arrangement for the proper operation thereof. The explanation of the operation of the circuit of Fig. 4 contained hereinbefore assumes a condition in which there is no cross roll.

Figure 5:
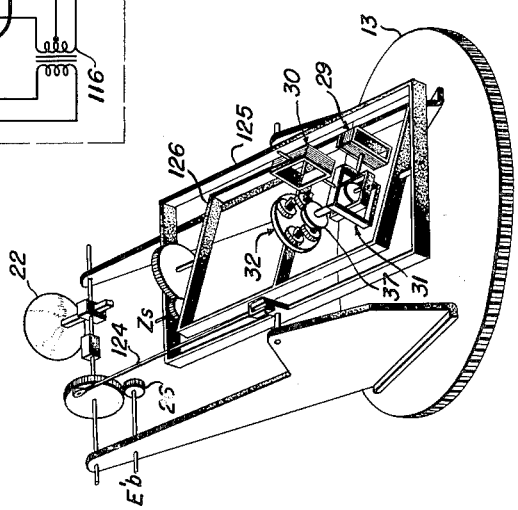
Fig. 5 is a fractional schematic diagram of a director and the apparatus of Fig. 1 according to another arrangement thereof.

In Fig. 5, to which particular reference is now made, there is shown schematically a torque motor and gyroscope assembly employed in another director arrangement. Outer frame 125 is rotated or positioned by $E'b$ or deck elevation as a result of link 124; inner frame 126 is rotated by $Zs$. The spin axis of the gyroscope accordingly tends to be maintained along the line of sight, suitable mounting means, not shown, being provided for the torque motors and gyroscope which allow freedom for precessive movements thereof.

The invention contemplates the use of component values throughout to provide for operation in the desired manner.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Anti-tumbling apparatus of the character disclosed comprising, in combination, means including radar for obtaining an A.-C. error signal containing two components, means including a reference generator operatively connected to said radar for obtaining an A.-C. reference voltage, phase discriminator means having both said signal and voltage applied thereto and constructed and arranged to provide a D.-C. output signal substantially proportional to the magnitude of one of said components, D.-C. amplifier means including a level setting device for said D.-C. signal, torque motor means energized from said amplifier means to produce a follow-up rate, a precessable gyroscope operatively connected to said torque motor means and adapted to be precessed upon the energization of said torque motor means, transformer means operatively coupled to said gyroscope and responsive to the amount the rate of precession thereof differs from the follow-up rate, the winding of the transformer means coupled to a switching circuit means, and said switching circuit means having the output thereof coupled to said amplifying means, said switching means being constructed and arranged to selectively switch conduction on the output thereof in accordance with the direction of precession to limit the torque of said torque motor means and hence limit the rate of precession of said gyroscope.

2. In apparatus of the character described, in combination, a first D.-C. amplifier, means operatively connected to said first D.-C. amplifier for adjusting the potential on the anode thereof in the absence of a signal to be amplified and applied thereto, a second D.-C. amplifier constructed and arranged to have the output thereof polarity sensitive to the direction of the change of potential on said anode from its normal value, torque motor means responsive to said second D.-C. amplifier and operated at a follow-up rate, gyroscope means operatively connected to said torque motor means to be precessed thereby, transformer means operatively coupled to said gyroscope means for obtaining a voltage proportional to the difference in the follow-up rate and the rate of precession, and circuit means operatively connecting said transformer means to said first D.-C. amplifier for applying a portion of said voltage to said first D.-C. amplifier in a manner to limit the precession of said gyroscope means.

3. Apparatus according to claim 2 wherein said circuit means is additionally characterized as containing a pair of biased diodes, said circuit means being constructed and arranged to pass current selectively to and from said first D.-C. amplifier selectively in accordance with the direction of precession of said gyroscope means.

4. In apparatus of the character disclosed, in combination, phase detector means constructed and arranged to provide a D.-C. output signal representative of the magnitude of a signal component applied thereto, a D.-C. amplifier connected to said phase detector means to be energized therefrom, level setting means operatively connected to said D.-C. amplifier, gyroscope means operatively connected to said D.-C. amplifier and constructed and arranged to be precessed at a rate corresponding to the magnitude of said output signal, transformer means energized by alternating current and mechanically coupled to said gyroscope means and constructed and arranged to regulate an output voltage proportional to the precession and of a polarity corresponding to the direction of said precession, a pair of phase detector means energized from said transformer means, a pair of biased diodes operatively connected to said pair of phase detector means and arranged to have their biases controlled therefrom and selectively to conduct in accordance with the direction of said precession, said biased diodes being operatively connected to said D.-C. amplifier and constructed and arranged to selectively lower and raise the potential applied to said D.-C. amplifier in accordance with which of said biased diodes is conducting.

5. In apparatus of the character disclosed, in combination, means for obtaining an error signal, gyroscope means operatively coupled to said means and constructed and arranged to be precessed in a pair of directions selectively in accordance with the polarity of said error signal and in an amount corresponding to the amplitude of said signal, transformer means responsive to the degree and direction of said precession and operatively coupled to said gyroscope means for generating voltages proportional to the degree and direction of precession, and anti-tumbling circuit means coupled between said transformer means and said coupling between said gyroscope means and said means for obtaining an error signal to receive said generated voltages, said anti-tumbling circuit means having conductive means therein for detecting the degree and direction of said generated voltages and applying degenerative voltages in the proper direction to said gyroscope means whereby the amplitude of the error signal applied to the gyroscope means is regulated in a direction to limit the amount of precession.

6. In an anti-tumble system of the type described, a gyroscope with gimbals for two degrees of freedom, a torque motor on each gimbal axis, a voltage source connected to each torque motor, a transformer with a finding on an open core, a dome of magnetic material carried by the gyroscope and movable across the poles of the core to change the reluctance of the core and to change the voltage across said winding, switching circuit means coupled between said winding and said voltage source for each of said motors to reduce the torque of said motor when the voltage across said winding exceeds a predetermined value, said switching circuit means each being constructed and arranged to selectively raise and lower the potential applied by said voltage source in accordance with the voltage changes of said core winding corresponding to the axis about which said gyroscope is being precessed.

7. A gyroscope anti-tumble system comprising a case movable in space, a gyroscope in the case, a torque motor mounted on the gyroscope to precess the gyroscope, a transformer consisting of a core and a winding on the core, means responsive to precessive movement of the gyroscope and magnetically coupled to said core to change the voltage across said winding, a first servo loop including a follow-up motor responsive to the winding voltage for driving said case in the direction of the gyroscope precessive movement, and a second servo loop including a switching circuit coupled to the winding and responsive to the winding voltages above a predetermined level and coupled to the torque motor input, said switching circuit having conduction means therein controlled by said winding voltage to produce voltages in magnitude and direction in accordance with the magnitude and direction of said winding voltages for limiting the precessive movement of the gyroscope.

References Cited in the file of this patent
UNITED STATES PATENTS

| | | |
|---|---|---|
| 1,959,804 | Wittkuhns | May 22, 1934 |
| 2,382,993 | Haskins | Aug. 21, 1945 |
| 2,383,409 | Newell | Aug. 21, 1945 |
| 2,414,102 | Hull et al. | Jan. 14, 1947 |
| 2,417,689 | Johnson | Mar. 18, 1947 |
| 2,433,843 | Hammond et al. | Jan. 6, 1948 |
| 2,660,793 | Holschuk et al. | Dec. 1, 1953 |
| 2,707,400 | Manger | May 3, 1955 |

UNITED STATES PATENT OFFICE
CERTIFICATE OF CORRECTION

Patent No. 2,978,912                 April 11, 1961

Nathaniel B. Nichols

It is hereby certified that error appears in the above numbered patent requiring correction and that the said Letters Patent should read as corrected below.

Column 8, line 64, for "finding" read -- winding --.

Signed and sealed this 12th day of September 1961.

(SEAL)
Attest:

ERNEST W. SWIDER                    DAVID L. LADD
Attesting Officer                    Commissioner of Patent

USCOMM-D